United States Patent
Wenger

[11] Patent Number: 5,365,914
[45] Date of Patent: Nov. 22, 1994

[54] MULTIPURPOSE TOOL

[75] Inventor: Ernst Wenger, Gwatt, Switzerland

[73] Assignees: Reserwa AG, Gwatt, Switzerland; Vitesse Etablissement, Vaduz, Liechtenstein; a part interest

[21] Appl. No.: 66,041

[22] PCT Filed: Oct. 12, 1992

[86] PCT No.: PCT/CH92/00208
§ 371 Date: Jun. 15, 1993
§ 102(e) Date: Jun. 15, 1993

[87] PCT Pub. No.: WO93/08001
PCT Pub. Date: Apr. 29, 1993

[30] Foreign Application Priority Data
Oct. 25, 1991 [CH] Switzerland .............. 3130/91-9

[51] Int. Cl.$^5$ .............................. B28D 1/08
[52] U.S. Cl. ........................ 125/21; 125/22; 30/381
[58] Field of Search ........... 125/12, 21, 22; 30/381, 30/382, 383; 83/661, 672, 835, 838, 842

[56] References Cited

U.S. PATENT DOCUMENTS

| 1,374,525 | 4/1921 | Pugh | 125/21 |
| 1,392,503 | 10/1921 | Jackson | 125/21 |
| 3,509,704 | 5/1970 | Henzman | 125/21 |
| 3,587,679 | 6/1971 | Conte | 125/21 |
| 3,886,926 | 6/1975 | Hall | 125/21 |
| 4,031,878 | 6/1977 | Hall | 125/21 |

FOREIGN PATENT DOCUMENTS 0364322 4/1990 European Pat. Off. .
WO82/01503 5/1982 WIPO .

*Primary Examiner*—M. Rachuba
*Attorney, Agent, or Firm*—Brady, O'Boyle & Gates

[57] ABSTRACT

A working tool has a large number of cutter rings (2.1 to 2.3) on a curved guide rod (1) of circular cross section. The guide yoke (1) exhibits at least two helical grooves winding in opposite directions along its outer side, the cutter rings engaging into these grooves in each case with at least one guide element. Consecutive cutter rings (2.1, 2.2) engage with their guide elements in each case into contrarotating grooves. When the rings are driven forward during operation of the tool, consecutive cutter rings will rotate in opposite directions on account of the helical grooves (8, 9).

11 Claims, 2 Drawing Sheets

MULTIPURPOSE TOOL

FIELD OF ART

The invention relates to a dismantling tool suitable, for example, for the demolishing or, respectively, tearing down of walls made of stone, concrete, and the like, or of wooden structures.

STATE OF THE ART

The necessity can arise, primarily when carrying out structural alterations and renovation of buildings, that wall breakthroughs must be provided, or inside installations must be removed, in a controlled fashion. Over-all, a great variety of tasks present themselves in the building industry, such as, for example, the milling of grooves, the provision of recesses for cable boxes, the cutting of steel, or the creation of core drillings. Such work has been performed heretofore usually by means of pick hammers and blowtorches and diamond milling cutters with water cooling. However, many of these devices are directed toward quite specific applications. All milling processes involve purely a cutting operation with a correspondingly extensive heat production.

REPRESENTATION OF THE INVENTION

It is an object of the invention to indicate an all-around tool usable for a great variety of different tasks, the term milling being understood to mean a combination of cutting and shattering.

In an all-around tool according to this invention, several cutter rings are forward-driven on a round guide yoke wherein the guide yoke exhibits at least two helical grooves running along its outside in opposite winding directions, and wherein consecutive cutter rings engage with a guide element into the oppositely oriented grooves in such a way that consecutive cutter rings contrarotate when driven forward along the guide yoke. The cutter rings thus are arranged along the guide yoke in the manner of a string of beads. If they are moved forwards, they execute a rotating movement tending to correspondingly cut open the solid item to be dismantled.

Preferably, each cutter ring has a target point for the engagement of a drive element. The cutter rings follow one another directly, as in the case of a string of beads. They contact one another so that, upon the forward driving of an individual cutter ring, all others are likewise driven forward. The cutter rings thus are independent elements driven from the outside.

The drive element preferably is a gear wheel engaging the cutter rings at a suitable place. For this purpose, the cutter rings are preferably constricted at their ends so that a kind of recess results between neighboring cutter rings into which the gear wheel can engage. In place of a gear wheel, it is also possible, in principle, to utilize a chain drive wherein driving cams inserted in the drive chain engage into the recesses of the cutter rings provided for this purpose.

The cutter rings proper are not entirely closed but rather are open at a point so that they can be guided past a holder of the guide yoke.

The guide yoke is an inherently closed rod. It is fixed advantageously to be exchangeable in a drive unit. The yoke can consist of two composable guide rods or can be welded into a one-piece ring.

The guide yoke exhibits a longitudinal rib on which it can be retained in the drive unit. The grooves extend, in the region of the longitudinal rib, in parallel to the latter so that the open cutter rings can be guided past the longitudinal rib. Preferably, the grooves and the longitudinal rib extend devoid of any rotation.

Since a considerable pressure is exerted on the cutter ring during the driving operation on account of the gear wheel, it is advantageous to provide a ball bearing on a side of the guide yoke in opposition to the driving gear wheel. This ball bearing is a kind of abutment preventing the cutter ring from being urged too vigorously onto the guide yoke and consequently the sliding friction from increasing too greatly.

The cutter rings can also be driven by means of a type of linear motor instead of by means of a gear or chain drive. In case of such a drive, stator windings are provided in the guide yoke. The cutter rings are fashioned as rotors and are turned and thereby driven forward by the rotating electromagnetic field generated by the stator windings.

The just-mentioned driving principle can be applied quite generally in the form of a drive unit for a great variety of usages (for example, railroads, elevators, etc.). Such a drive unit is distinguished in that at least one annular element is movably supported on a round, dimensionally stable guide rail in such a way that it can travel along the guide rail solely with execution of a helical movement. The guide rail, designed as a stator along the lines of an electric motor, rotates the at least one annular element which latter moves forwards on the guide rail on account of its corresponding guidance.

In the multipurpose tool according to this invention, a linear drive mechanism can also be provided exerting a force on the rings, which force points in the direction of the forward movement. Due to the guidance in a helical groove, a rotation of the cutter rings results simultaneously during the forward motion. The advantage of electrical linear drive units resides in that the rings can be driven along the entire length of the guide yoke.

According to another preferred embodiment, the guide yoke exhibits ducts for a cooling medium so that compressed air, for example, can be introduced into the guide yoke from the drive unit; this compressed air exits again at the milling end and cools the cutter rings. By a corresponding shape of the outlet ducts in the cutter ring, the kinetic energy contained in the cooling medium can also be exploited for driving the cutter ring proper.

The stripped material can be removed by suction with a dust protection hood at least partially surrounding the guide yoke. The dust protection hood can be pushed back, for example with spring force, against the drive unit. A suction fan system removes the dust from underneath the dust protection hood.

Preferably, the helical grooves have a lead which varies along the guide yoke. In this way, a continuous transition can be achieved between the rotation-free region in the drive unit and the rotating region at the forward end of the yoke.

Additional advantageous features of the invention can be derived from the following description, and the drawings.

BRIEF DESCRIPTION OF THE DRAWINGS

The invention will be described in greater detail below with reference to embodiments and in conjunction with the drawings wherein.

In the drawings, identical parts basically bear the same reference symbols.

POSSIBILITIES FOR PERFORMING THE INVENTION

Figure 1:
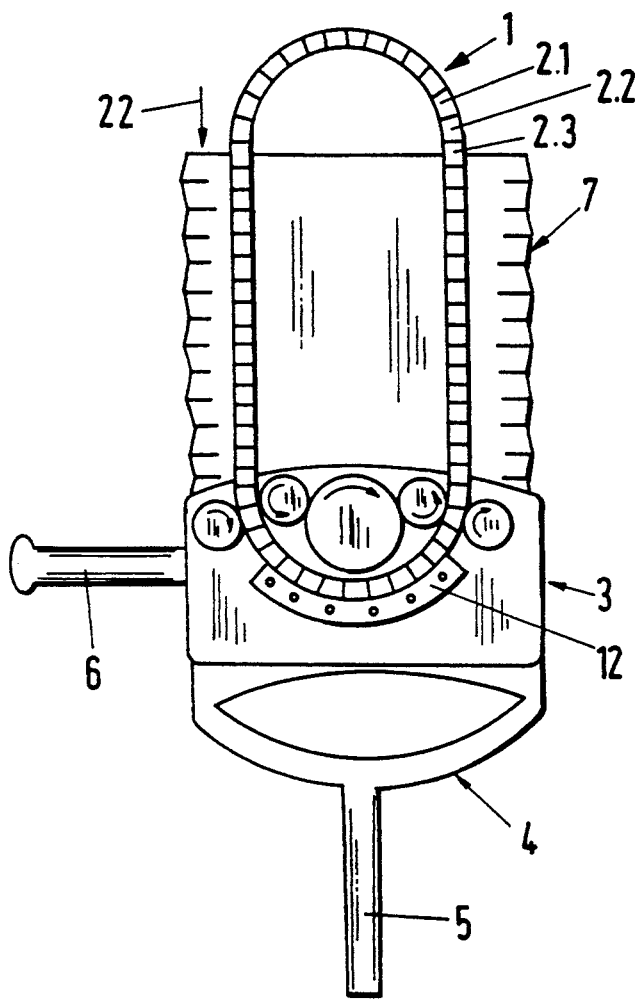
FIG. 1 is a schematic illustration of a multipurpose tool according to this invention.

FIG. 1 shows schematically a preferred embodiment of an interchangeable tool according to this invention. A guide yoke 1 with cutter rings 2.1, 2.2, 2.3, . . . arranged thereon in the manner of a string of pearls is fixed in a drive unit 3. The drive unit 3 exhibits suitably designed handles 4, 5, 6 on the outer side of its housing. These handles can be fashioned, for example, so that the working tool can be guided in the manner of a conventional motorized chain saw. By means of the handle 5, the working tool can be attached, for example, in a tool guiding device so that the tool need not be guided manually and can be rotated in its entirety about its longitudinal axis.

According to an advantageous embodiment, a bellows-shaped dust protection hood 7 is provided. The latter covers at least part of the guide yoke 1. The hood, overcoming the bias of a spring, can be pushed back rearwardly against the drive unit 3 (compare arrow 22). Thus, with the forward part of the working tool eating into the material during the dismantling of a wall, the dust protection hood 7 is successively pushed back because it is in contact with the wall. A suction removal unit, not shown in detail and advantageously accommodated in the drive unit, removes the dust present underneath the dust protection hood by means of suction.

The guide yoke 1 is inherently closed. In the present example, the yoke is of an oval shape and consequently has a round forward end and a round rear end and two interposed straight sections. Thus, it has the configuration of a zero ("0").

Figure 2:
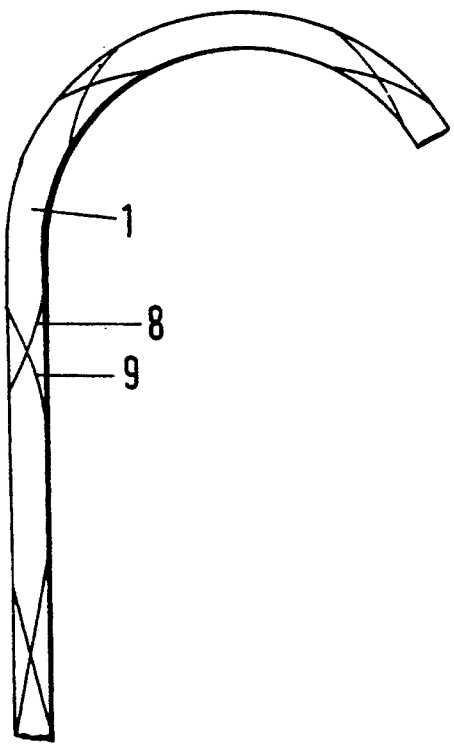
FIG. 2 is an illustration of the guide yoke with helical grooves.

FIG. 2 shows a section of the guide yoke 1 without cutter rings. The essential feature of this guide yoke 1 is the presence of helical grooves 8, 9. In this arrangement, at least two oppositely turning grooves 8, 9 are provided. According to a preferred embodiment, the lead of the corresponding helix changes along the guide yoke 1. In the linear intermediate sections, this lead is larger than in the curved forward region where the milling step is primarily carried out and where a higher speed of rotation is desirable.

The cutter rings 2.1, 2.2, 2.3, . . . engage with a guide element, e.g. a pivot, into one of the two contrarotating grooves. During pushing in the forward direction, a rotating movement of the cutter rings is thereby obtained. According to the invention, two directly consecutive cutter rings 2.1 and 2.2, and 2.2 and 2.3, respectively, engage into respectively oppositely turning grooves. As a self-evident consequence, the consecutive cutter rings always rotate in opposite directions. Correspondingly, during the milling step, mutually opposed force components arise at neighboring cutter rings. These components essentially nullify each other so that the working tool mills extensively free of drift.

In place of the pivot engaging into the groove, it is also possible to utilize a ball supported in a hemispherical recess (on the inside of the cutter ring) and traveling in the helical groove. Such a guidance which is similar to a ball bearing is distinguished by low friction losses.

Figure 3:
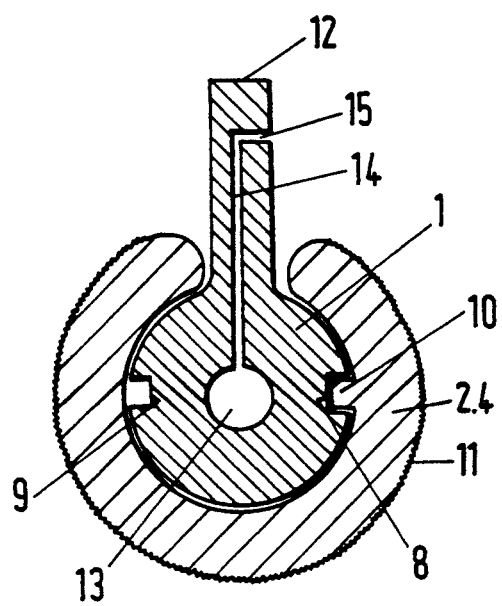
FIG. 3 shows an axial cross section through the guide yoke with longitudinal rib.

FIG. 3 shows an axial cross section of the guide yoke 1 and of the cutter ring 2.4. The guide yoke 1 is round in cross section and exhibits a longitudinal duct 13 in its interior. In this duct, compressed air or a coolant can be conducted. Feeding is effected by way of an inlet port 15 and a feeding duct 14. The inlet port 15 is provided on a longitudinal rib 12 of the guide yoke 1.

The longitudinal rib permits fixation of the guide yoke 1 in the drive unit 3. As can be derived from FIG. 1, the guide rib 12 is arranged in the curved portion of the guide yoke 1. This rib projects in the manner of a comb toward the outside and is preferably situated in a plane, i.e. it does not wind around the guide yoke 1.

The cutter rings are designed so that they can travel past this longitudinal rib. This will be explained with reference to FIG. 3. The cutter ring 2.4 is not a closed ring but rather an open one. The gap of this ring is precisely of such a size that it can accommodate the longitudinal rib 12 therein. In cross section, the cutter ring 2.4 is thus of a C-shaped appearance.

The grooves 8 and 9 extend in parallel to the longitudinal rib 12. This is necessary for the reason that, on the one hand, the ring 2.4 engages with its guide element 10 into one of the two grooves 8 (and thus is guided by the groove) and, on the other hand, the longitudinal rib 12 must be guided in the gap of the ring.

The outside of the cutter ring 2.4 is suitably fashioned as a milling surface 11. For the working of stone or concrete, this can be, for example, a coating with incorporated diamond crystals. For the working of wood, hard-metal teeth can be provided, for example, on the surface.

As illustrated in FIG. 1, the longitudinal rib 12 is equipped, for example, with drilling holes so that the guide yoke 1 can be fixedly attached by screws in the drive unit 3 in an exchangeable fashion.

Figure 4:
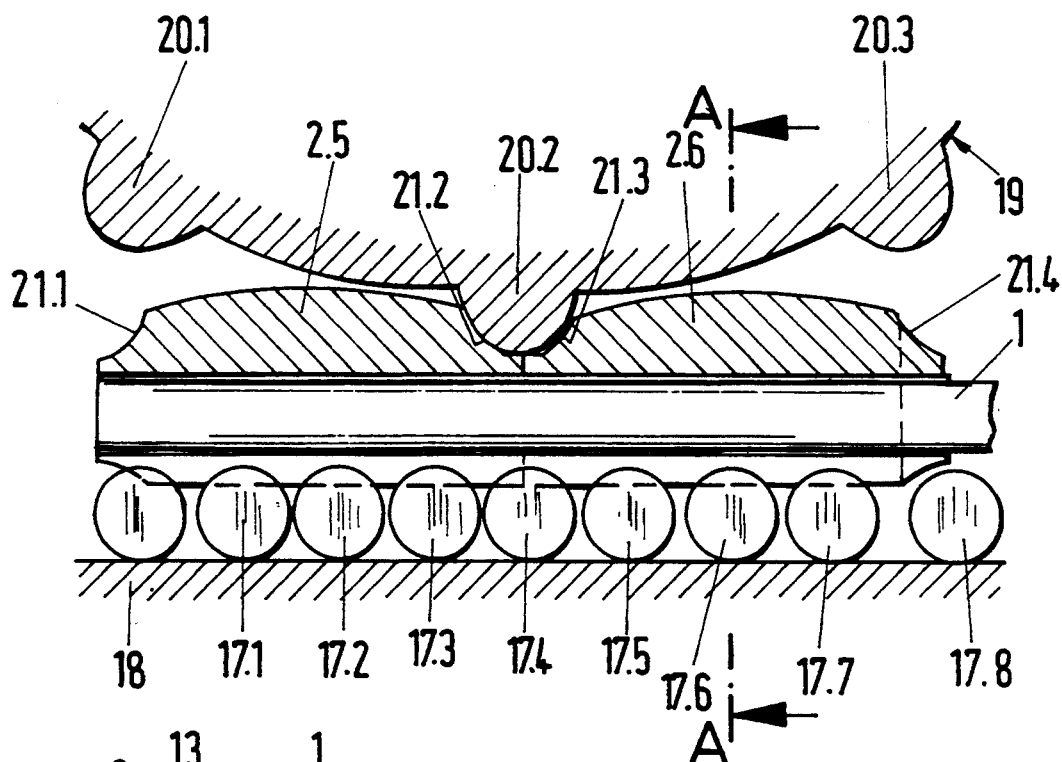
FIG. 4 is a schematic view of the drive means in the axial longitudinal section of the guide yoke.
Figure 5:
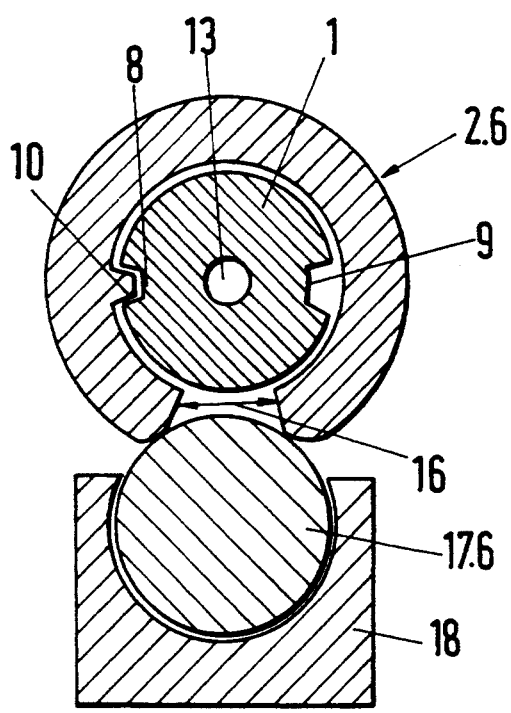
FIG. 5 is an axial cross section A—A according to FIG. 4.

The essential aspect of the drive unit 3 is constituted by the means for the forward-driving of the cutter rings 2.1, 2.2, 2.3, . . . This is indicated in FIG. 1 schematically by means of rollers. An advantageous embodiment of these drive means is shown in FIGS. 4 and 5. FIG. 4 shows an axial longitudinal section. Two cutter rings are denoted by 2.5 and 2.6. These rings exhibit constrictions 21.1 and 21.2, respectively 21.3 and 21.4 at their ends. On account of these narrowed portions (e.g. 21.2 and 21.3), a kind of recess is produced between two neighboring cutter rings 2.5 and 2.6 which can serve as the target site for a gear wheel 19. This gear wheel 19 exhibits teeth 20.1 to 20.3 at suitable intervals. FIG. 4 shows how a tooth 20.2 engages in between two adjacent cutter rings 2.5 and 2.6. The cutter rings are driven forward by the rotation of the gear wheel, the latter itself exerting force always on only one of the cutter rings, but this cutter ring, in turn, further drives all other cutter rings on account of the direct contact with subsequent cutter rings.

Since the force effect exerted by the gear wheel generates not only a longitudinal component but also a transverse component (i.e. a radial component with respect to the axis of the guide yoke 1), an undesirably high friction and thus wear (between cutter ring and guide yoke) could arise unless certain countermeasures are taken. In accordance with an especially preferred embodiment of the invention, a ball bearing is therefore provided as an abutment on the side lying in diametrical opposition to the gear wheel 19 with respect to the axis of the guide yoke. The ball bearing exhibits steel balls 17.1 to 17.8 on which the cutter rings can travel along preferably with their opening (gap).

FIG. 5 illustrates the preferred mode of rolling along. The guide yoke 1 and the cutter ring are shown in an axial cross section (section A—A according to FIG. 4). The ball 17.6 is conventionally guided in a bearing rail 18. The cutter ring 2.5 rolls along the ball 17.6 in principle with its gap 16. In this way, the pressure (radial component) of the gear wheel 19 acting from the opposite side can be absorbed on the cutter ring 2.5.

In principle, one gear wheel of the aforedescribed type is sufficient for driving the cutter rings. However, it may be advantageous to produce the required thrust force with several gear wheels. The driving gear wheels are driven, for example, by means of an electric motor suitably geared down by means of a transmission.

According to a preferred embodiment, a fan is also provided in the drive unit 3 (compare FIG. 1) for exhausting the dust underneath the dust protection hood 7. Preferably, the drive unit 3 also comprises a compressed-air connection by way of which compressed air can be introduced which is fed into the duct system of the guide yoke 1. At the front end of the yoke, suitable bores are provided through which the compressed air can flow out so that the cutter rings can be cooled.

Since the air or the cooling medium exits from the aforementioned bores of the guide yoke 1 at a high kinetic energy, an additional driving action can be exerted on the cutter rings by a suitable alignment of the bores and/or by a suitable guidance of the air along or within the cutter rings. The driving action is obtained, in particular, by a duct configuration with air deflection effect provided at the cutter ring.

The cooling medium being exhausted can, however, also be used for rendering the material to be stripped brittle with the aid of the temperature-generated quenching effect, and thus for increasing the stripping speed.

The essential aspect resides in that the guide rod exhibits two oppositely winding helices. It is, of course, also within the scope of the invention to provide more than two grooves. Thus, it may be advantageous, for example, to arrange, for each direction of rotation, two "synchronously" turning grooves. Each cutter ring then engages into both "synchronously" rotating grooves. In this way, the stress can be distributed between two guide elements.

Advantageously, contrarotating helical grooves have the same leads. In this way, it can be ensured that the tearing-out forces during stripping optimally compensate each other (see above). However, the leads can be readily of different magnitudes, especially in a stress-free part, i.e. where normally no milling step is performed (for example, in the proximity of the drive unit 3).

A chain drive mechanism would also be usable in place of a gear wheel, this mechanism being equipped with lugs of such spacings that they can in each case engage in between the consecutive cutter rings.

In the above-described embodiment, the cutter rings are individual parts not connected to one another. However, it is also definitely within the cope of the invention to join the cutter rings to one another in the manner of a chain so that they can be pulled over the guide yoke. It is understood that the connection must be such that the cutter rings are freely rotatable with respect to one another. Thus, the connection can be established, for example, by a tubular extension with an outer bead at the end, affixed to a cutter ring, wherein the outer bead engages at the subsequent cutter ring in a continuously extending channel-like recess in a suitable way. With such a chain-like connection, the cutter rings can, of course, be driven by way of thrust as well as traction.

In case the guide yoke is designed to be slightly elastic (but yet rugged), then the yoke can be deformed with a small device so that the milling profile can be adapted to the respective requirements. This device involves a clamping bracket that can be placed around the straight sections of the guide yoke and contracts these sections to a greater or lesser extent. The clamping bracket has rollers at suitable places so that the cutter rings can roll past.

It is especially advantageous for the cutter rings to be driven along the lines of an electric linear motor. This means that the guide yoke represents the stator while the cutter rings are fashioned as rotors. Thus, stator windings are arranged in the guide yoke and generate a rotating magnetic field. On account of the magnetic field, the cutter rings, designed correspondingly, are forced to rotate. Since they, in turn, are located in the engagement track of a helical groove, a rotational movement can be executed only in conjunction with a forward movement. In other words: The cutter rings are driven forward. The advantage of this kind of driving operation resides in that it can be effective not only in the portion of the guide yoke extending in the handle or housing of the working tool on the cutter rings, but essentially along the entire yoke.

Of course, it is not necessary for each cutter ring to be fashioned as a rotor. It is enough if several of them, for example every second one per groove, perform this function.

The just-described drive mechanism is based on the fact that a magnetic field rotating about the guide yoke exerts an azimuthal force on the cutter ring designed as the rotor. The conversion of this azimuthal force into a forward movement is brought about by the principle of helical guidance. It is clear that this drive concept in its application is not limited to the working tool according to this invention but can also be utilized for elevators, railroads, etc.

It is, of course, also possible to employ linear drive concepts wherein there are produced, in the guide yoke, forward-traveling magnetic fields or even forward-traveling and simultaneously rotating magnetic fields through the guide yoke, for driving the cutter rings fashioned in a suitable way as rotors.

In summation, it can be noted that the invention provides a novel working tool which can be utilized in a simple and versatile fashion. Besides the tasks as set out above, other tasks can likewise be accomplished efficiently. One example that can be cited is the building of a gallery or a tunnel. This problem can be solved by making the working tool of a very large dimension and rotating the tool during drilling about its longitudinal axis.

I claim:

1. Multipurpose tool wherein several cutter rings (2.1 to 2.6) are driven forward on a guide yoke (1) of round cross section, wherein the guide yoke (1) comprises at least two helical grooves (8, 9) extending along its outside in opposite sense of rotation, and wherein consecutive cutter rings (2.1, 2.2) engage with a guide element (10) into the contrarotating grooves (8, 9) in such a way that the consecutive cutter rings (2.1, 2.2) rotate in opposite directions when they are driven forward.

2. Multipurpose tool according to claim 1, characterized in that each cutter ring (2.1 to 2.6) has a target site for the engagement of a drive element (19, 20.1 to 20.3), and that the cutter rings (2.1 to 2.6) follow one another with mutual contact so that during the forward driving of an individual cutter ring (2.5) all preceding ones are likewise driven forward.

3. Multipurpose tool according to claim 2, characterized in that the drive element is a gear wheel (19) and that the cutter rings (2.5, 2.6) are constricted at their ends in such a way that the gear wheel (19) can engage at the constrictions (21.1 to 21.4).

4. Multipurpose tool according to claim 1, characterized in that the cutter rings (2.1 to 2.6) are open so that they can be guided past a holder (12) of the guide yoke (1).

5. Multipurpose tool according to claim 1, characterized in that the guide yoke (1) is inherently closed, and that it is exchangeably affixable in a drive unit (3).

6. Multipurpose tool according to claim 5, characterized in that the guide yoke (1) exhibits a longitudinal rib (12) for fixation in the drive unit (3), and that the grooves (8, 9) extend, in the region of the longitudinal rib (12), devoid of rotation and in parallel to the longitudinal rib (12) so that the open cutter rings (2. 4) can be guided past the longitudinal rib (12).

7. Multipurpose tool according to claim 3, characterized in that, as an abutment for the cutter rings (2.5, 2.6), a ball bearing (17.1 to 17.8, 18) is provided on a side of the guide yoke (1) lying in opposition to the driving gear wheel (19).

8. Multipurpose tool according to claim 1, characterized in that the guide yoke (1) exhibits ducts (13, 14) so that a cooling medium, especially compressed air, can be introduced from the drive unit (3), this cooling medium being exhausted, for cooling the cutter rings (2.1 to 2.3), at another location out of the guide yoke (1).

9. Multipurpose tool according to claim 1, characterized in that a dust protection hood (7) that can be pushed back against spring force covers the guide yoke (1) at least in part, and that the dust can be removed with the aid of a suction fan system.

10. Multipurpose tool according to claim 1, characterized in that the helical grooves (8, 9) exhibit varying leads.

11. Multipurpose tool wherein several cutter rings (2.1 to 2.6) are driven forward on a guide yoke (1) of round cross-section, wherein the guide yoke (1) comprises at least two helical grooves (8,9) extending along its outside in opposite sense of rotation, and wherein consecutive cutter rings (2.1, 2.2) engage a guide element (10) into the contrarotating grooves (8,9) in such a way that the consecutive cutter rings (2.1, 2.2) rotate in opposite directions when they are driven forward, wherein the guide yoke is fashioned along the lines of an electric linear motor, with the guide yoke fashioned as the stator and the cutter rings as rotors.

* * * * *